Aug. 13, 1968    M. F. BROWNING ET AL    3,397,075
PROCESS OF VAPOR COATING NUCLEAR FUEL WITH
BERYLLIUM OXIDE AND CARBON
Filed Feb. 1, 1965
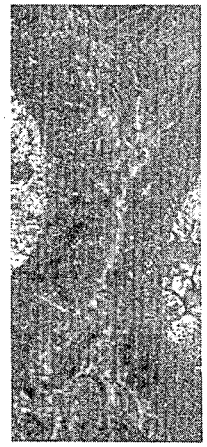 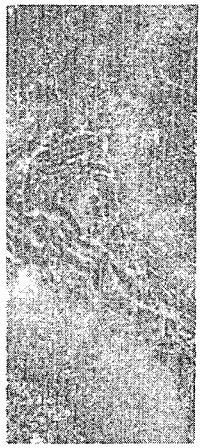 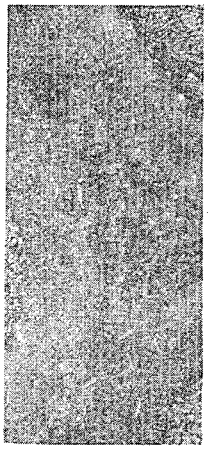
Sample a     Sample b     Sample c
 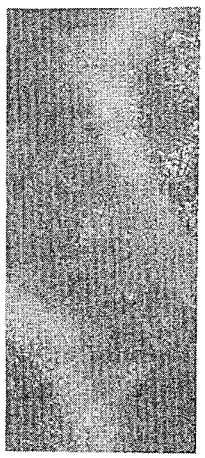 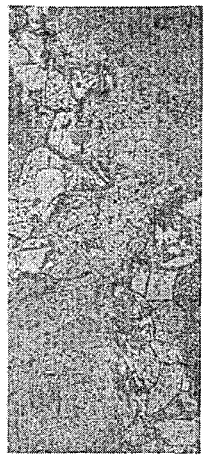
Sample d     Sample e     Sample f
INVENTORS
Melvin F. Browning
Wilbur J. Wilson
By:
Attorney

United States Patent Office 3,397,075
Patented Aug. 13, 1968

3,397,075
PROCESS OF VAPOR COATING NUCLEAR FUEL WITH BERYLLIUM OXIDE AND CARBON
Melvin F. Browning and Wilbur J. Wilson, Columbus, Ohio, assignors to the United States of America as represented by the United States Atomic Energy Commission
Filed Feb. 1, 1965, Ser. No. 429,689
2 Claims. (Cl. 117—46)

ABSTRACT OF THE DISCLOSURE

A process of coating nuclear fuel and blanket materials, such as uranium dioxide particles, comprising the steps of (1) converting a beryllium salt that forms beryllium oxide by hydrolysis, oxidation or pyrolysis in the vapor state to beryllium oxide at a temperature of 800–1500° C., (2) incorporating acetylene in the vapor and (3) contacting the nuclear fuel on blanket material with the vapor to yield a codeposit of beryllium oxide and 5 to 15 weight percent carbon.

---

This invention relates to a novel refractory fuel or blanket material for use in nuclear reactors and to a process for making it. In particular, the invention deals with nuclear fuel or blanket particles or pellets coated with beryllium oxide that have improved mechanical properties.

Beryllium oxide coatings have been applied to nuclear fuel heretofore by hydrolysis of vaporized beryllium compounds, such as the chloride or the acetate. The materials so coated, however, showed one drawback, namely that, under the effect of the elevated temperature in the reactor and/or the radiation and even during heat treatment before use, a considerable growth of the grains occurred in the coating, which is undesirable, because this impairs the ability of the coating to contain fission products, particularly volatile fission products.

It is an object of this invention to apply a beryllium oxide coating to nuclear fuel or blanket materials which does not experience any appreciable grain growth under the influence of heat or radiation.

It is another object of this invention to apply a beryllium oxide coating to nuclear fuel or blanket materials which does not form cracks during use in the reactor, so that a good containment of the formed fission-product gases is obtained.

It is still another object of this invention to apply a beryllium oxide coating to nuclear fuel or blanket materials which has superior mechanical properties.

It is finally also an object of this invention to apply a beryllium oxide coating to nuclear fuel or blanket materials which has a low parasitic neutron-capture cross section.

It has been found that the presence of carbon within the beryllium oxide coating has a retarding effect on the grain growth of the fuel or blanket material, provided that the carbon was deposited in or with the beryllium oxide. The result of the mixed deposition of beryllium oxide and carbon is by far better than the effect of beryllium oxide alone. An explanation for this unexpected finding cannot be given.

The process of this invention thus comprises incorporating finely divided carbon either by thermally decomposing at the same time gaseous beryllium and carbon compounds while in contact with the fuel particles to be coated or by depositing carbon into pores by infiltration, whereby a homogeneous deposit of beryllium oxide and carbon is formed which has a fine uniform grain structure and is very stable as to grain size.

Various types of fuels and blanket materials can be used for the process of this invention. For instance, uranium dioxide, plutonium dioxide, and thorium dioxide have been found suitable.

The beryllium salt that is to be decomposed thermally for the deposition of beryllium oxide must be a salt that forms beryllium oxide by hydrolysis, oxidation or pyrolysis. Beryllium halides, acetates and other metal organic compounds can be used for this purpose; they are introduced, together with oxidizing reactants, into the container holding the fuel particles or pellets. The temperature preferred for these reactions of hydrolysis and thermal decomposition can range from 800 to at least 1500° C., about 1200° C. being preferred. At 1250° C. and above, the carbon dioxide-hydrogen mixture obtained can serve the purpose of the steam and thus replace it.

Various hydrocarbons gaseous at normal temperature can be used for the source of the carbon. Methane and acetylene are suitable, but the latter at a temperature of below 1500° C. is preferred. The quantity of the hydrocarbon is dosed so that the beryllium oxide coating contains from 5 to 15% by weight of carbon. As mentioned, the coating thus formed is uniform, fine-grained and fairly corrosion-resistant.

If desired, the imperviousness of the beryllium oxide-carbon deposit can be furthermore improved by superimposing a carbon-free beryllium oxide layer on the carbon-containing coating, whereby the surface porosity is decreased and the imperviousness increased.

In order to demonstrate the stability of grain size of the product of this invention, the fuel particles coated by the process of this invention were subjected to a heat-treatment step. This treatment consisted of heating for between two and four hours at about 1500° C. in a non-oxidizing atmosphere, for instance in hydrogen or helium. It was found that this heat treatment did not increase the size of the particles of the coating prepared by the process of this invention.

For carrying out the coating process, any apparatus can be used that is known to those skilled in the art for the deposition of metals or metal compounds from vapors. The inventors preferred to apply the coating in a so-called fluidized bed, which is obtained by passing a gas upwardly through a bed of solid particles at a sufficient velocity to separate the particles from each other and to maintain them out of contact. In this condition a certain degree of freedom to move is imparted to the solid particles so that the solid-gas mixture behaves much like a liquid.

In the following, an example is given to illustrate one embodiment of this invention and to show the improvement that is obtained by the codeposition of carbon in the coating.

Example

A cylindrical quartz reaction vessel contained uranium dioxide particles to be treated. Beryllium chloride vapors and hydrogen gas were introduced at the bottom of said vessel, while steam, acetylene and hydrogen were introduced at the top of the reaction vessel. The beryllium chloride had been formed in a container located immediately below the reaction vessel and connected therewith, by reacting beryllium metal with hydrogen chloride.

The uranium dioxide particles had an average diameter of 127 microns and a density of above 93% of the theoretical density. The coating was carried out at 1200° C. for several hours until the coating layer had reached a thickness of 24 microns. At this point the carbon content of the beryllium oxide was 8.8% by weight, the structure of the coating was relatively porous, but the surface was smooth sample (a). This coating was then tested by heating for two hours at 1500° C. The sample was etched, and a photomicrograph was made sample (b). Another sample was heated also for two hours but at 1600° C., and again a photomicrograph was taken after etching sample (c).

Another set of samples was prepared under similar conditions but without the introduction of acetylene and thus without the deposition of carbon sample (d). Again, both heat treatments were applied for the same periods of time, that at 1500° C. sample (e) and that at 1600° C. sample (f), and photomicrographs were taken also in this case.

The accompanying drawing shows the six photomicrographs. It will be obvious that samples a–c have a very fine and uniform grain size as compared with samples (e) and (f).

This clearly indicates the beneficial effect of a carbon deposit in the coating.

It will be understood that the invention is not to be limited to the details given herein but that it may be modified within the scope of the appended claims.

The embodiments of the invention in which an exclusive property or privilege is claimed are defined as follows:

1. In a process for coating nuclear fuel and blanket material by converting a beryllium salt that forms beryllium oxide by hydrolysis, oxidation or pyrolysis in the vapor state to beryllium oxide at a temperature of 800–1500° C. in the presence of said nuclear fuel and blanket material to vapor deposit beryllium oxide on said material, the improvement comprising incorporating sufficient acetylene in the vapor in contact with said nuclear fuel and blanket material to codeposit 5 to 15 weight percent of carbon on the nuclear fuel and blanket material with the beryllium oxide.

2. A process for coating uranium dioxide particles comprising establishing and maintaining a fluidized bed of uranium dioxide particles by passing hydrogen gas and beryllium chloride vapors upwardly therethrough, heating the bed to 1200° C. and introducing steam, hydrogen and acetylene at the top of the bed to codeposit beryllium oxide and 5 to 15 weight percent carbon on the uranium dioxide particles.

References Cited
UNITED STATES PATENTS

| | | | |
|---|---|---|---|
| 2,791,522 | 5/1957 | Gross | 117—46 |
| 2,810,365 | 10/1957 | Keser | 117—46 |
| 3,067,048 | 12/1962 | Gion | 106—55 X |
| 3,249,509 | 5/1966 | Blocher | 176—91 |
| 3,251,337 | 5/1966 | Latta et al. | 117—106 |
| 3,290,223 | 12/1966 | Blocher et al. | 176—91 X |
| 3,293,070 | 12/1966 | Lloyd et al. | 117—106 |

FOREIGN PATENTS

| | | |
|---|---|---|
| 933,500 | 8/1963 | Great Britain. |

OTHER REFERENCES

Powell et al.: Vapor Deposition, 1956, pp. 136 to 138 and 142 relied upon.

ALFRED L. LEAVITT, *Primary Examiner.*

A. GOLIAN, *Assistant Examiner.*